(12) United States Patent
Culli et al.

(10) Patent No.: US 6,442,259 B2
(45) Date of Patent: *Aug. 27, 2002

(54) SYSTEM AND METHOD FOR FORWARDING CALL FROM DISCONNECTED TELEPHONE NUMBER TO NEW TELEPHONE NUMBER

(75) Inventors: Laura Culli; M. Lourdes Coronado, both of Austin, TX (US); Mark Tamasi, St. Louis, MO (US); John E. Simino; Michael E. Kolker, both of San Antonio, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/923,355

(22) Filed: Aug. 8, 2001

Related U.S. Application Data

(63) Continuation of application No. 09/559,129, filed on Apr. 28, 2000, which is a continuation of application No. 09/112,383, filed on Jul. 9, 1998, now Pat. No. 6,088,433.

(51) Int. Cl.[7] .............................................. H04M 15/00
(52) U.S. Cl. .............................. 379/114.05; 379/114.02; 379/114.28; 379/211.02; 379/212.01
(58) Field of Search ............................ 379/111–115.03, 379/120, 127.01–127.06, 130–134, 207, 211–212; 455/406–409, 460

(56) References Cited

U.S. PATENT DOCUMENTS

| | | |
|---|---|---|
| 4,053,949 A | 10/1977 | Recca et al. |
| 4,959,855 A | 9/1990 | Daudelin |
| 5,339,352 A | 8/1994 | Armstrong et al. |
| 5,369,695 A | 11/1994 | Chakravarti et al. |
| 5,487,111 A | 1/1996 | Slusky et al. |
| 5,502,759 A | 3/1996 | Cheng et al. |
| 5,579,379 A | 11/1996 | D'Amico et al. |
| 5,598,464 A | 1/1997 | Hess et al. |
| 5,613,006 A | 3/1997 | Reese |
| 5,625,681 A | 4/1997 | Butler, II |
| 5,657,382 A | 8/1997 | Tamagawa et al. |
| 5,661,792 A | 8/1997 | Akinpelu et al. |
| 5,689,555 A | 11/1997 | Sonnenberg |
| 5,703,935 A | 12/1997 | Raissyan et al. |
| 5,771,283 A | 6/1998 | Chang et al. |
| 5,832,061 A | 11/1998 | Rubin |
| 5,854,836 A | 12/1998 | Nimmagadda |
| 5,892,821 A | 4/1999 | Turner |
| 5,917,899 A | 6/1999 | Moss et al. |
| 6,088,433 A | * 7/2000 | Culli et al. |

\* cited by examiner

*Primary Examiner*—Duc Nguyen
(74) *Attorney, Agent, or Firm*—Greenblum & Bernstein, P.L.C.

(57) ABSTRACT

A call forwarding system for an AIN telecommunications environment is provided in which a destination has changed from an old telephone number to a new telephone number. A calling party places a call which attempts to contact the destination by dialing the old telephone number. The call forwarding system includes a hub switch, and an old address switch with which the calling party connects to upon dialing the old telephone number. The old address switch, upon recognizing that the calling party has called a telephone number which has been changed, prefixes the old telephone number with a three digit code, and forwards the call, along with the prefixed old telephone number, to the hub switch. The hub switch recognizes the three digit code, and launches an AIN trigger to an AIN platform which determines the new telephone number and whether the destination has elected to pay for forwarding the call to the new telephone number. The AIN platform also determines whether the calling party has elected to pay for forwarding the call to the new telephone number when the destination has not elected to pay for forwarding the call. The AIN platform completes the call to a new telephone number switch if either the destination or the calling party has elected to pay for forwarding the call. If neither the destination nor calling party has elected to pay for call forwarding, the call is not forwarded and is handled by standard switch based intercept treatment.

21 Claims, 9 Drawing Sheets

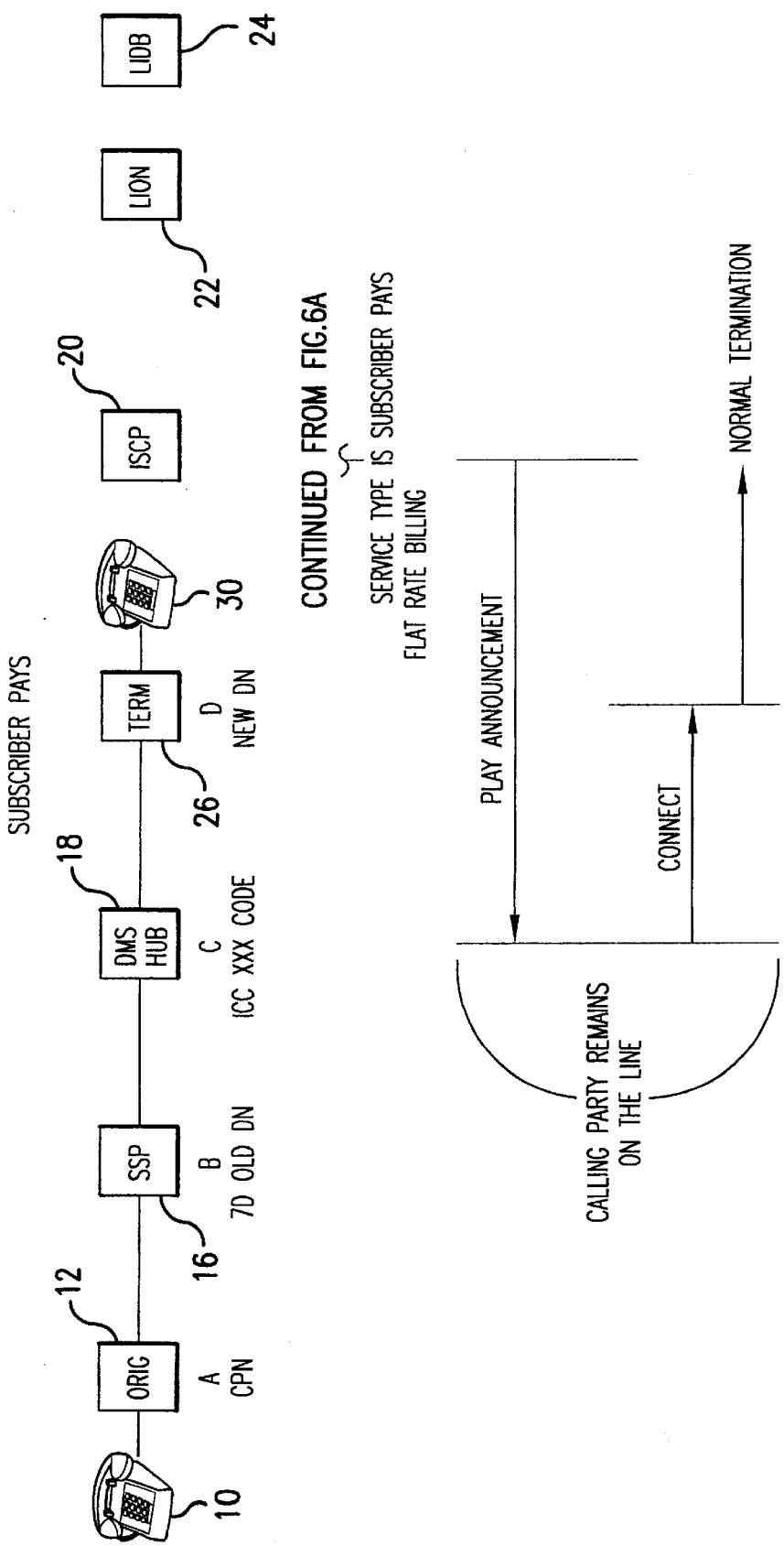

SYSTEM AND METHOD FOR FORWARDING CALL FROM DISCONNECTED TELEPHONE NUMBER TO NEW TELEPHONE NUMBER

CROSS REFERENCE TO RELATED APPLICATION

The present application is a continuation of U.S. patent application Ser. No. 09/559,129, filed on Apr. 28, 2000, entitled "System And Method For Forwarding Call From Disconnected Telephone Number To New Telephone Number" which is a continuation of U.S. patent application Ser. No. 09/112,383, filed Jul. 9, 1998, now U.S. Pat. No. 6,088,433, issued on Jul. 11, 2000, the disclosures of which are expressly incorporated herein by reference in their entireties.

BACKGROUND OF THE INVENTION

1. Field of the Invention

The present invention is related to an apparatus and method for telecommunications. More particularly, the present invention relates to an apparatus and method for forwarding calls to a new telephone number when an old telephone number has been changed, and billing an appropriate party for completing the call.

2. Background Information

In conventional telephone communication systems, when a telephone company's customer changes telephone numbers, a party calling the customer at the old telephone number receives a message informing the calling party that the number has changed. Typically, the message also informs the calling party of the new telephone number. In order to reach the customer, the calling party must then make note of the new telephone number, hang up and dial the new telephone number. Requiring the calling party to make note of the new number and redial the customer's new number may be enough of an inconvenience to prevent the calling party from attempting to contact the customer a second time. For example, the calling party may forget the new number before dialing it or may already know a telephone number of a competing business. Thus, particularly if the customer is a business, the loss of potential callers, e.g., business customers, is highly undesirable.

Other systems such as directory assistance call completion are also available. Directory assistance call completion is a system having logic residing within a switch for forwarding calls to a requested telephone number. According to directory assistance call completion, a calling party calls directory assistance and provides information necessary to determine the telephone number of a destination party the calling party would like to contact. Then, directory assistance provides the calling party with the destination party's telephone number and offers the option of completing the call to the destination for a fee which is paid by the calling party. The calling party may then agree to pay the fee and have the call forwarded or simply make note of the number, hang up and redial the destination telephone number. The directory assistance call completion service has a significant drawback in that the service operates within the switch, consuming valuable switch system resources.

Therefore, a need exists for a flexible call forwarding system which allows calls to be forwarded. The system should not operate at the switch level and should allow the option of billing either the calling party or the telephone company's customer for forwarding calls.

SUMMARY OF THE INVENTION

In view of the foregoing, the present invention, through one or more of its various aspects, embodiments and/or specific features or subcomponents, is thus intended to bring about one or more of the advantages as specifically noted below.

A call forwarding system for an AIN telecommunications environment is provided in which a destination has changed from an old telephone number to a new telephone number, and a calling party places a call which attempts to contact the destination by dialing the old telephone number. The call forwarding system includes a locator that determines the new telephone number, a sponsor determiner, and a system. The sponsor determiner determines whether the destination has elected to pay for forwarding the call from the old telephone number to the new telephone number. When the destination has not elected to pay for forwarding the call, the sponsor determiner also determines whether an eligible calling party has elected to pay for forwarding the call from the old telephone number to the new telephone number. The system completes the call from the calling party to the new telephone number if either the destination or the calling party has elected to pay for forwarding the call.

According to a preferred embodiment, the call forwarding system also includes a hub system which analyzes the old telephone number and initiates an AIN trigger to an AIN platform if the old telephone number satisfies a predetermined criteria. The hub system includes a first central office and a hub central office. The first central office receives digits dialed by the calling party, prefixes a unique code to the received digits and subsequently forwards the prefixed received digits to the hub central office. The unique code causes the AIN trigger. The AIN platform determines an NPA of the dialed number based upon a code identifying the first central office and the unique code. A database is queried by using the received digits and the NPA to determine the new telephone number, and whether the destination has elected to sponsor the call forwarding. According to a preferred embodiment, the AIN platform includes a judging system which determines whether the calling party is eligible to pay for forwarding the call when the destination has not elected to pay for call forwarding. The judging system determines whether the calling party is served by the same telephone company as a telephone company serving the old telephone number. The judging system indicates the calling party is eligible to pay for call forwarding if the same telephone company serves the calling party. The judging system also determines a type of service/equipment utilized by the calling party and determines whether the calling party's service/equipment complies with eligibility requirements, thereby making the calling party eligible to pay for forwarding the call. The judging system indicates the calling party's eligibility if the service/equipment complies with the eligibility requirements.

The call forwarding system also includes ACU measurement that measures the usage of an ISCP central processing unit. Furthermore, if neither the calling party nor destination has elected to pay for forwarding the call, the call is not forwarded.

According to a preferred embodiment, a call forwarding system for an AIN telecommunications environment is provided in which a destination has changed from an old telephone number to a new telephone number. A calling party places a call which attempts to contact the destination by dialing the old telephone number. The call forwarding system includes a hub switch, and an old address switch with which the calling party connects to upon dialing the old telephone number. The old address switch, upon recognizing that the calling party has called a telephone number which has been changed, prefixes the old telephone number with a three digit code, and forwards the call, along with the prefixed old telephone number, to the hub switch. The hub switch recognizes the three digit code, and initiates a query to an AIN platform. The AIN platform determines the new telephone number and whether the destination has elected to pay for forwarding the call to the new telephone number. The AIN platform also determines whether the calling party has elected to pay for forwarding the call to the new telephone number when the destination has not elected to pay for forwarding the call. The AIN platform completes the call to a new telephone number switch if either the destination or the calling party has elected to pay for forwarding the call. If neither the destination nor calling party has elected to pay for call forwarding, the call is not forwarded.

A call forwarding method for an AIN telecommunications environment is provided in which a destination has changed from an old telephone number to a new telephone number, and a calling party places a call which attempts to contact the destination by dialing the old telephone number. The call forwarding method includes locating the new telephone number, and determining whether the destination has elected to pay for forwarding the call from the old telephone number to the new telephone number. When the destination has not elected to pay for forwarding the call, the method also includes determining whether an eligible calling party has elected to pay for forwarding the call from the old telephone number to the new telephone number. The method also includes completing the call from the calling party to the new telephone number if either the destination or the calling party has elected to pay for forwarding the call.

According to a preferred embodiment, the call forwarding method also includes receiving digits dialed by the calling party at a first central office, prefixing a unique code to the received digits, and forwarding the prefixed received digits to a hub central office where the unique code causes an AIN trigger to an AIN platform. The AIN platform determines an NPA of the dialed number based upon a code identifying the first central office, and the unique code. The call forwarding method also includes querying a database, with the received digits and the NPA as keys, to determine the new telephone number and whether the destination has elected to sponsor the call forwarding.

According to a preferred embodiment, the call forwarding method also includes judging whether the calling party is eligible to pay for forwarding the call when it is determined that the destination has not elected to pay for call forwarding. Furthermore, the call forwarding method includes judging whether the calling party is served by a same telephone company as a telephone company serving the old telephone number, and indicating the calling party is eligible to pay for call forwarding if the same telephone company serves the calling party.

The call forwarding method also includes determining a type of service/equipment utilized by the calling party, determining whether the calling party's service/equipment complies with eligibility requirements, thereby making the calling party eligible to pay for forwarding the call, and indicating the calling party's eligibility if the service/equipment complies with the eligibility requirements.

The call forwarding method also includes measuring the usage of an ISCP central processing unit. The call forwarding method also includes terminating the call when neither the calling party nor destination has elected to pay for forwarding the call.

A call forwarding method for an AIN telecommunications environment is provided in which a destination has changed from an old telephone number to a new telephone number, and a calling party places a call which attempts to contact the destination by dialing the old telephone number. The call forwarding method includes connecting to an old address switch upon dialing the old telephone number, and prefixing the old telephone number with a three digit code. Subsequently, the call is forwarded, along with the prefixed old telephone number, to a hub switch. The method also includes recognizing the three digit code at the hub switch and initiating an AIN trigger, determining the new telephone number and whether the destination has elected to pay for forwarding the call to the new telephone number. When the destination has not elected to pay for forwarding the call, the method also includes determining whether the calling party has elected to pay for forwarding the call to the new telephone number. The method also includes completing the call to a new telephone number switch if either the destination or the calling party has elected to pay for forwarding the call. If neither the calling party nor destination has elected to pay for forwarding the call, the call is terminated.

The above-listed and other features and advantages of the present invention will be more fully set forth below.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout several views of the drawings, and in which:

FIGS. 6A and 6B is a message flow diagram showing the message flow between various components of the AIN network for situations when the subscriber pays according to an aspect of the present invention;

DETAILED DESCRIPTION OF THE PREFERRED EMBODIMENTS

Figure 1:
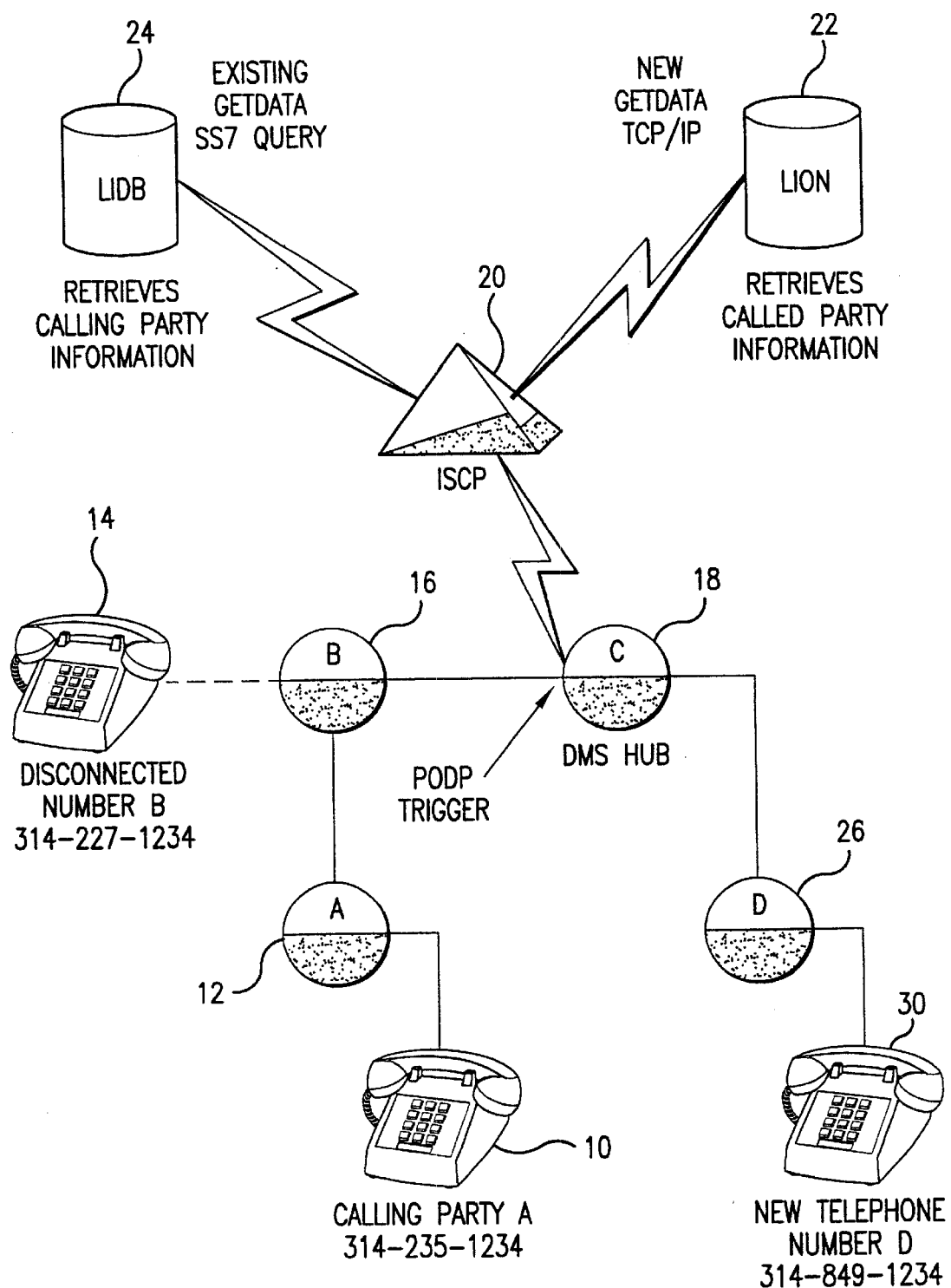
FIG. 1 illustrates a general system overview of a call forwarding system according to the present invention.

Referring now to the accompanying drawings, FIG. 1 illustrates a general system overview of a call forwarding system in accordance with an embodiment of the present invention.

According to the call forwarding system, a calling party 10 attempts to contact a destination or customer 30 who has changed telephone numbers. In the example illustrated in FIG. 1, originally the customer's telephone number was (314) 227-1234, but it has been changed to (314) 849-1234. In the case when the calling party 10 has not been advised of the new telephone number, the calling party 10 dials the old, disconnected telephone number 14 of the customer 30 which causes the calling party's central office 12 to establish a connection with the central office of the dialed telephone number 16. The central office 16 determines that the dialed telephone number 14 has been disconnected and forwards the call to a hub 18 which is designated to handle disconnected telephone numbers. The hub 18 then generates a trigger causing processing to occur within an advanced intelligent network (AIN) platform including an integrated services control point (ISCP) 20. The ISCP 20 queries a Line Information for Open Networks (LION) database 22 to determine whether the disconnected number 14 is eligible for call forwarding, whether the customer 30 has paid to have calls forwarded to the new telephone number and what the new telephone number is. If it is determined that the destination 30 has paid for call forwarding, and the disconnected number 14 is eligible for call forwarding, an announcement is played informing the calling party 10 of the new telephone number and stating that the destination 30 has paid to forward the call automatically. Subsequently, the call is forwarded from the hub 18 to the new telephone number's central office 26 which rings the new telephone number 30.

However, if the destination 30 has not paid for call forwarding, but the disconnected number 14 is eligible for call forwarding, the ISCP 20 queries a line information database (LIDB) 24 to determine whether the calling party 10 is eligible to pay to forward the call. If the calling party 10 is eligible, the ISCP 20 plays an announcement to the calling party 10 informing the calling party 10 of the new telephone number and asking the calling party 10 if the calling party 10 would like to pay to have the call forwarded to the new number. If the calling party 10 does not want the call forwarded, the calling party 10 hangs up and the call terminates without being forwarded. If the LIDB query indicated that the calling party 10 is not eligible for call forwarding, the call is directed to standard intercept processing. If the calling party 10 is eligible and would like the call forwarded, the call is forwarded to the new telephone number 30 in the same manner that the call is forwarded to the new telephone 30 when the customer 30 has paid for the forwarding.

Thus, the call forwarding system of the present invention forwards a call from a telephone number that has been disconnected to the new telephone number if someone is willing to pay for the call forwarding. Moreover, the call forwarding system determines whether the customer (subscriber) has elected to pay for the call forwarding or whether the calling party has elected to pay for the call forwarding.

According to a preferred embodiment, call forwarding only occurs if the old telephone number and new telephone number are both served by the same telephone company and the new telephone number is within the local calling scope of the old telephone number. New telephone numbers not meeting these requirement are not translated in the central office of the dialed telephone number and are not routed to the hub. When the old telephone number is changed, if the new telephone number satisfies these requirements, the switch of the old telephone number is informed so that a trigger will occur on the old telephone number.

According to a preferred embodiment, the calling party pays option is available on a per call basis to calling parties who are customers of the telephone company serving the old telephone number. Moreover, calling parties with certain services and equipment are not eligible to pay for forwarding calls, e.g., calling parties using hotel telephones. Any call excluded from utilizing the call forwarding system of the present invention can be provided with standard switch based intercept treatment. Consequently, the current standard intercept trunk group and routing scheme remain in place throughout the network but will see some reduced usage.

Most advanced intelligent network (AIN) switch types may be used to implement the call forwarding system of the present invention. Each switch must have SS7 capability for communicating with an integrated services control point (ISCP), and must be able to prefix a unique (0XX) three digit code to interface with a DMS hub. Examples of switches are the Lucent Technologies 1AESS, the Lucent Technologies 5ESS, the Northern Telecom (Nortel) DMS-100, and the Ericsson AXE switch.

Preferably, the hub 18 is a DMS central office switch; however, any other switch with the ability to provide the recorded announcement capability (voicing back the digits of the new telephone number) may be used alternatively. By using designated hub locations, it becomes unnecessary to establish triggers for each intercepted telephone number within a telephone company's network. Thus, all eligible intercepted calls are routed to designated hub locations where the trigger occurs.

The DMS switch 18 acts as the trigger hub for the call forwarding system of the present invention. In other words, all eligible calls to the telephone numbers which have been changed are intercepted at the old telephone number's switch 16 and rerouted to the DMS hub 18 for triggering.

When the calling party uses the call forwarding system of the present invention and completes the call via the DMS switch (hub) 18, all legs of the call are held for the duration of the call. In particular, the call will hold a trunk from central office 12 to central office 16, a trunk from central office 16 to central office 18, and a trunk from central office 18 to central office 26 for the duration of the call. In contrast, according to prior systems, a customer encountering the intercepted number would have redialed the call from central office 12 directly to central office 26 holding only one trunk for the duration of the call. As a result of the call processing required to implement the present invention and the announcement treatment for each intercepted call at the DMS hub 18, the calling party's hold time increases by 25 to 30 seconds for each call to a disconnected telephone number 14. However, the advantages of the present invention outweigh the increased hold time.

Rerouting the call to the DMS hub 18 requires using a non-switch numbering plan area (NPA) code, such as 0XX. This three digit code routing index prefix should be standardized throughout the telephone company's network to minimize the number of call processing records (CPRs) required within the ISCP 20. Preferably, the same 0XX code is used throughout multiple market areas, i.e., standardized across the telephone company's network. However, multiple 0XX codes need to be assigned when two or more NPA codes reside within the same switch.

For example, if the calling party 10 dials (314) 227-1234 (the called party number (CDN)), the intercepting switch 16 prefixes the 0XX code (e.g., 022) resulting in 022 227-1234 being forwarded to the DMS hub 18. In other words, 314 is not forwarded, rather, the logic within the CPR recreates the original NPA 314 using the signaling point code (SPC), which identifies the switch that forwarded the digits, and 0XX code.

The Line Identification for Open Networks (LION) database 22 is a database application available from Nortel.

TCP/IP queries into the LION database occur when implementing the present invention. A line information database (LIDB) 24, available from Bell Communications Research, Inc. of Livingston, N.J., is also provided. TCP/IP queries into the LIDB database are utilized for the call forwarding system of the present invention.

According to a preferred embodiment, answer supervision does not occur until the new telephone number 30 answers the call. Thus, any toll charges applicable from the calling party 10 to the intercepted number 14 are charged to the calling party if and only if the call is answered at the new station 30.

Figure 2:
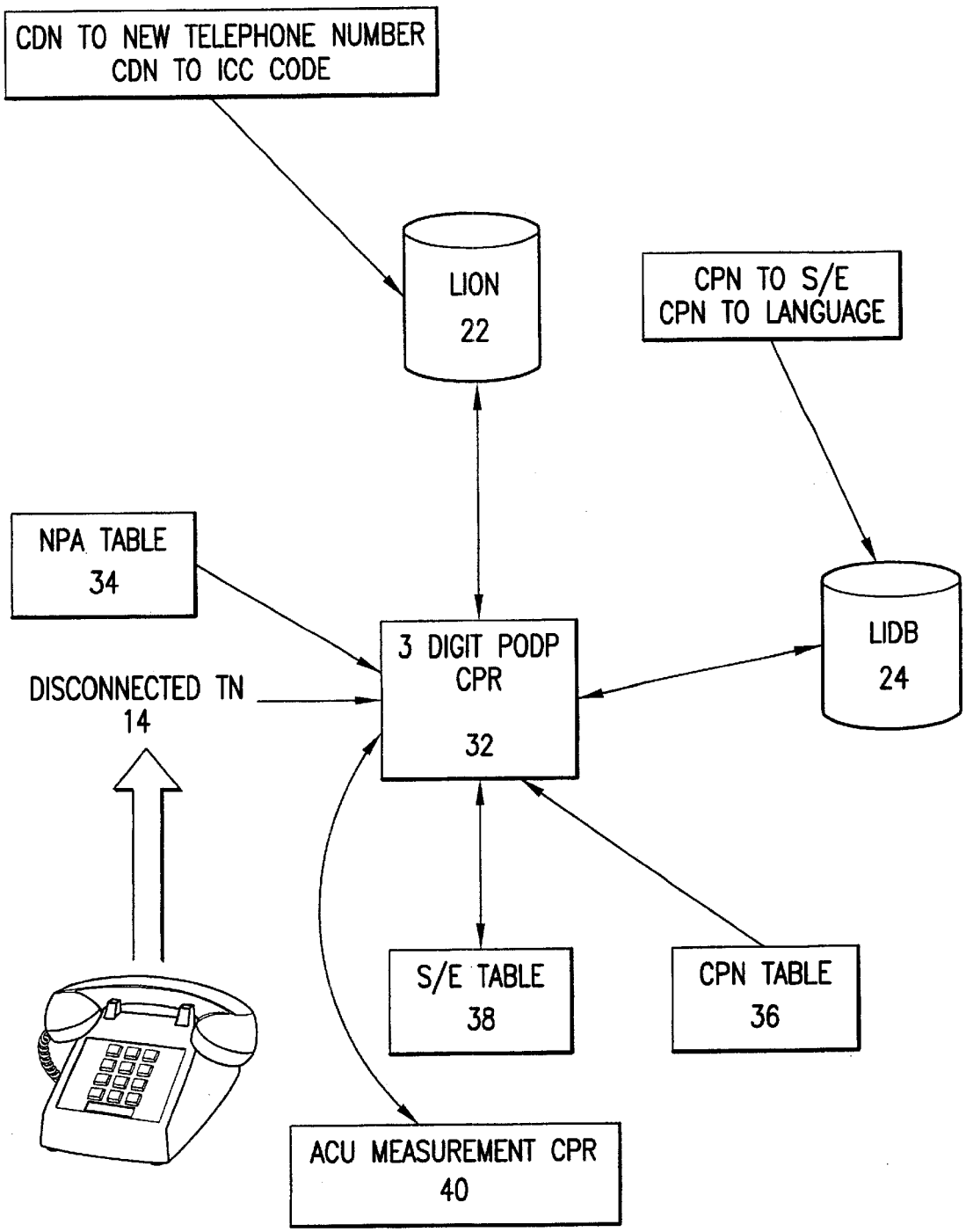
FIG. 2 is a block diagram illustrating the relationship between the components of the system of the present invention.
Figure 3:
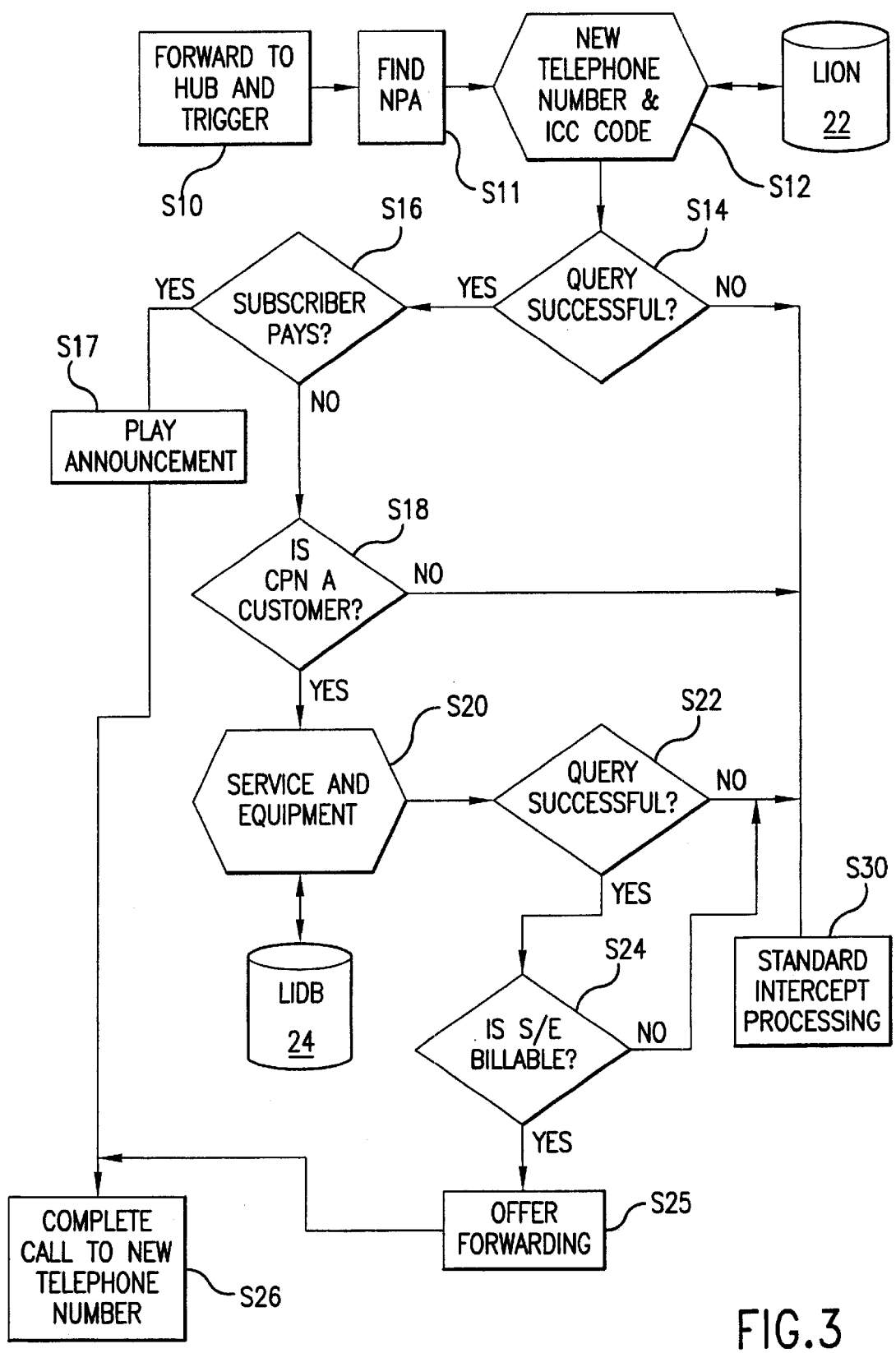
FIG. 3 illustrates an exemplary logic flow for handling calls to telephone numbers which have been changed according to an aspect of the present invention.

Referring now to FIG. 2 and FIG. 3, a simplified flow of the logic for the call forwarding system of the present invention, and an exemplary relationship between call forwarding components are illustrated. First, at step S10 the calling party 10 calls the disconnected telephone number 14 causing the called number with a three digit routing index prefix to be routed to the DMS hub 18. The three digit routing index then causes a Public Office Dialing Plan (PODP) trigger to occur on the three digits and a three digit PODP CPR 32 executes. The PODP trigger is an AIN trigger created in an office as opposed to a trigger on a telephone line.

The three digit PODP CPR 32 executes whenever the three digit PODP trigger is encountered at the DMS hub switch 18. This CPR 32 determines the new telephone number, and who will pay for the forwarding. If the calling party pays, the CPR 32 also determines whether the calling party is billable by the telephone company. If the logic at any point determines that the call may not be handled by the call forwarding system of the present invention, the call is directed to the existing intercept system for standard switch based processing. Otherwise, the CPR 32 directs commencement of announcements which inform the calling party of the new telephone number, and the CPR 32 may direct the call to be forwarded to the new telephone number 30, depending upon the designated sponsor of the service (subscriber or caller) and whether the calling party 10 remains on the line.

Thus, at step S10, a PODP trigger CPR 32 commences execution after the DMS hub 18 receives the phone number prefixed with the three digit routing index. At step S11, the logic first maps the three digit routing index prefix to the dialed NPA based upon the prefix sent from the switch 16 and the SPC of the originating switch 16. The NPA is found in a stand alone NPA table 34 preferably, but not necessarily located within the ISCP 20. The keys into this table 34 are the three digit routing index prefix and the SPC, and the data retrieved is the NPA associated with the dialed number.

When the NPA associated with the three digit routing index prefix is successfully found, at step S12 a query is launched to the LION database 22 via the generic data interface (GDI) over TCP/IP using a get data query, which is described below. The key into the LION database 22 is the originally called number (CDN), which is reconstructed to ten digits with the NPA found in the NPA table 34 as described above. The result of this query, if successful, contains two data elements: the new 10-digit telephone number and an ICC code. The ICC code designates three things: whether call forwarding is paid for by the subscriber or the caller; the class of service (for example, business or residence) of the intercepted number, if the subscriber is paying; and the designated language (e.g., English or Spanish) of any announcement to be played, if the subscriber is paying.

If the LION query is determined to be unsuccessful at step S14, the call is handled by the standard intercept system at step S30. Otherwise, if the query is successful, at step S16 it is determined whether the result of the query to the LION database 22 indicates that the subscriber is paying for call forwarding. If it is determined that the subscriber pays, at step S17 an announcement is played informing the calling party of the new number, and the fact that the destination has paid to automatically forward the call. The message varies in language based upon the ICC code returned by the LION database 22. Subsequently, at step S26 the call is completed to the new telephone number.

If the LION database query indicates that the calling party is paying, at step S18 it is determined whether the caller's NPANXX is an NPANXX serviced by the telephone company. A look up in a CPN table 36 which includes all NPANXXs served by a telephone company can be used to determine whether the caller's particular NPANXX is serviced by the telephone company. The CPN table 36 is preferably, but not necessarily, stored within the ISCP 20. If the calling party's NPANXX is found in the CPN table 36, i.e., the CPN is within the subscriber's telephone company network, at step S20 a query is launched to the LIDB 24. However, if at step S18 it is determined that the calling party's NPANXX is not within the CPN table 36, the call is handled by the standard intercept system at step S30.

The primary purpose of the LIDB query is to determine whether the telephone company is able to bill the calling party for the call forwarding. Thus, the query retrieves the type of service and equipment (S/E) of the calling party from the LIDB 24. In other words, an S/E field is retrieved from LIDB 24 using the calling party's number as the access key. The retrieved S/E field designates the type of service and equipment of the calling party, for example, pay phone, residence line, hotel, etc. Only specific S/E codes are billable and therefore only the calling parties having the billable S/E codes are allowed to be offered the option of paying for call forwarding. Billable codes are stored in a S/E table 38, preferably but not necessarily residing within the ISCP 20. According to a preferred embodiment, only calling parties with plain old telephone service (POTS), business and residence lines can be billed. In other words, only S/E codes representing POTS business and residence lines appear in the S/E table 38. Thus, CENTREX lines, prison telephones, coin telephones, hotel/motel telephones etc. cannot be billed and are not eligible for calling party pays option. Of course, it is the telephone company which determines which types of lines can be billed and the above represents only one example of billable S/E.

If the query to the LIDB 24 is determined to be unsuccessful at step S22, the call is routed to the standard intercept system at step S30 for standard processing. However, if the query is successful, at step S24 it is determined whether the CPN's S/E code is in the S/E table 38 (i.e., is billable). If the CPN's S/E code is not within the S/E table 38, the call is routed to the standard intercept system at step S30 and no offer for call forwarding is presented to the caller. If the caller's S/E code is determined to be billable at step S24, the calling party is offered the option to have the call forwarded to the new telephone number at step S25.

Another element which may be returned from the LIDB query, at step S20, is a language indicator. If a calling party is determined to be a Spanish speaking customer, the announcement may be played in Spanish and this field is populated with a value of one. Otherwise, the announcements are played in English. It is possible for the customer to dictate the result of the language query at the time the telephone number is changed.

At step S25 a series of announcements is played to the caller. These announcements vary in language, based upon the value of the language indicator returned from the LIDB 24. It is preferable that the announcements direct the calling party to hang up to avoid being charged for the call forwarding. If, and only if, the caller stays on the line throughout the announcements, at step S26 the call is completed to the new telephone number which was found in the LION database 22. If the caller hangs up at any time during the series of announcements, the caller is not billed for call completion.

In summary, the three digit PODP CPR 32 facilitates call completion of intercepted calls when the new telephone number is known, and when either the subscriber has paid to have the calls completed, or the caller is billable by the telephone company and chooses to pay for the call forwarding by remaining on the line.

An AIN call unit (ACU) measurement CPR 40 may also be provided to record service measurements and perform data sampling for error conditions. The service measurements measure how much of the ISCP's CPU resources are being used in terms of AIN call units (ACU's). This CPR 40 is separate from the trigger CPR(s) because of the ISCP limitation on the number of overall service measurement vectors available. The ACU CPR 40 is called by the three digit PODP CPR 32.

The NPA table 34 is a stand alone table used by the three digit PODP CPR 32 to determine the NPA and "normal" intercept route index associated with the three digit routing index prefix and the SPC of the incoming query. Because the full 10-digit CDN is not sent in the TCAP message to the CPR, the NPA table 34 is necessary to determine the NPA of the CDN so that the full 10-digit CDN may be used to perform the query to the LION database 22. The NPA table 34 utilizes the prefix (three digit) and the SPC of the querying switch as the keys into the table, and the associated NPA and the intercept route index are returned. In summary, the prefix table 34 exists only once in each ISCP 20 and converts the three digit prefix to an NPA.

The S/E table 38 is used by the three digit PODP CPR 32 to check whether the service/equipment indicator returned from LIDB 24 is a valid, billable number. Only when the S/E indicator corresponding to the CPN is found in the S/E table 38 is the intercepted call allowed to complete to the new telephone number 30. The service/equipment table contains an integer value, which is the S/E indicator, as the key. The service/equipment table exists only once in each ISCP and contains only a single column listing all valid S/E values.

The CPN table 36 is used by the three digit PODP CPR 32 to ensure that queries to the LIDB 24 for a given CPN are launched only if the CPN's NPANXX is supported in the telephone company's LIDB. Without this prescreening, the query could get lost or rejected by the SS7 network. Furthermore, without this prescreening, the phone company may have access to the LIDB of another phone company without the ability to bill the other phone company's customers for the forwarding of the call.

In another embodiment, a GDI map table (not shown) is provided between the three digit PODP CPR 32 and the LION 22 and also between the three digit PODP CPR 32 and the LIDB 24. The GDI map table is used by the three digit PODP CPR 32 to format and perform the query to external databases such as the LION 22 and LIDB 24 databases. In other words, the GDI map table translates information from the three digit PODP CPR 32 format into the external databases' formats.

According to a preferred embodiment, logic error handling may be provided. According to this preferred embodiment, if an improper code is received by the ISCP 20 from the LION 22, an error message containing the called party number is provided to facilitate investigation. This logic error handling occurs when either the CDN is not eligible for call forwarding or the code returned from the LION database 22 is incorrect.

Get data messages are used to query external systems such as the LION database 22 and LIDB 24. The get data message generally includes a transmission ID number unique to the get data query for identifying the get data query and a 10-digit telephone number, for example, the old telephone number 14. The return result from the get data query typically includes the same transmission ID associated with the get data query, a field indicating whether or not the query was successful, a field indicating the ICC option, i.e., who is paying for the forwarding, the language a message should be played in, whether or not the line is a business line or residence line, and the new 10-digit telephone number.

Table 1 below illustrates exemplary ICC codes returned from the LION database 22.

TABLE 1

| ICC Code | Calling Party Pays | Subscriber Pays | Residence Line | Business Line | English | Spanish |
| --- | --- | --- | --- | --- | --- | --- |
| 72 |   | X | X |   | X |   |
| 73 |   | X |   | X | X |   |
| 74 | X |   |   |   |   |   |
| 75 |   | X | X |   |   | X |
| 76 |   | X |   | X |   | X |

Each ISCP 20 requires an SS7 (LIDB) GDI interface in order to access the LIDB 24. A TCP/IP GDI interface for LION 22 is also necessary at each ISCP.

Some DMS hubs 18 do not operate properly when an intra switch intercept is required. An example of an intra switch intercept is when the calling party 10 is calling a disconnected number 14 having a central office which also operates as the hub. A solution to the intra switch problem is to route all DMS intra switch intercepted calls to another DMS hub location 18. The solution increases the availability of the call forwarding system of the present invention in the DMS switch, however, it adds to the network load between the two switches. Thus, calls received on switches which also operate as hubs are treated in the same manner as intercepted numbers in switches not acting as hubs. That is, the intercepted number is assigned a 0XX code and the call is routed to a DMS hub over an SS7 trunk.

An exemplary message flow between various components of the call forwarding system of the present invention are now described with reference to FIGS. 4, 5, and 6.

Figure 4A:
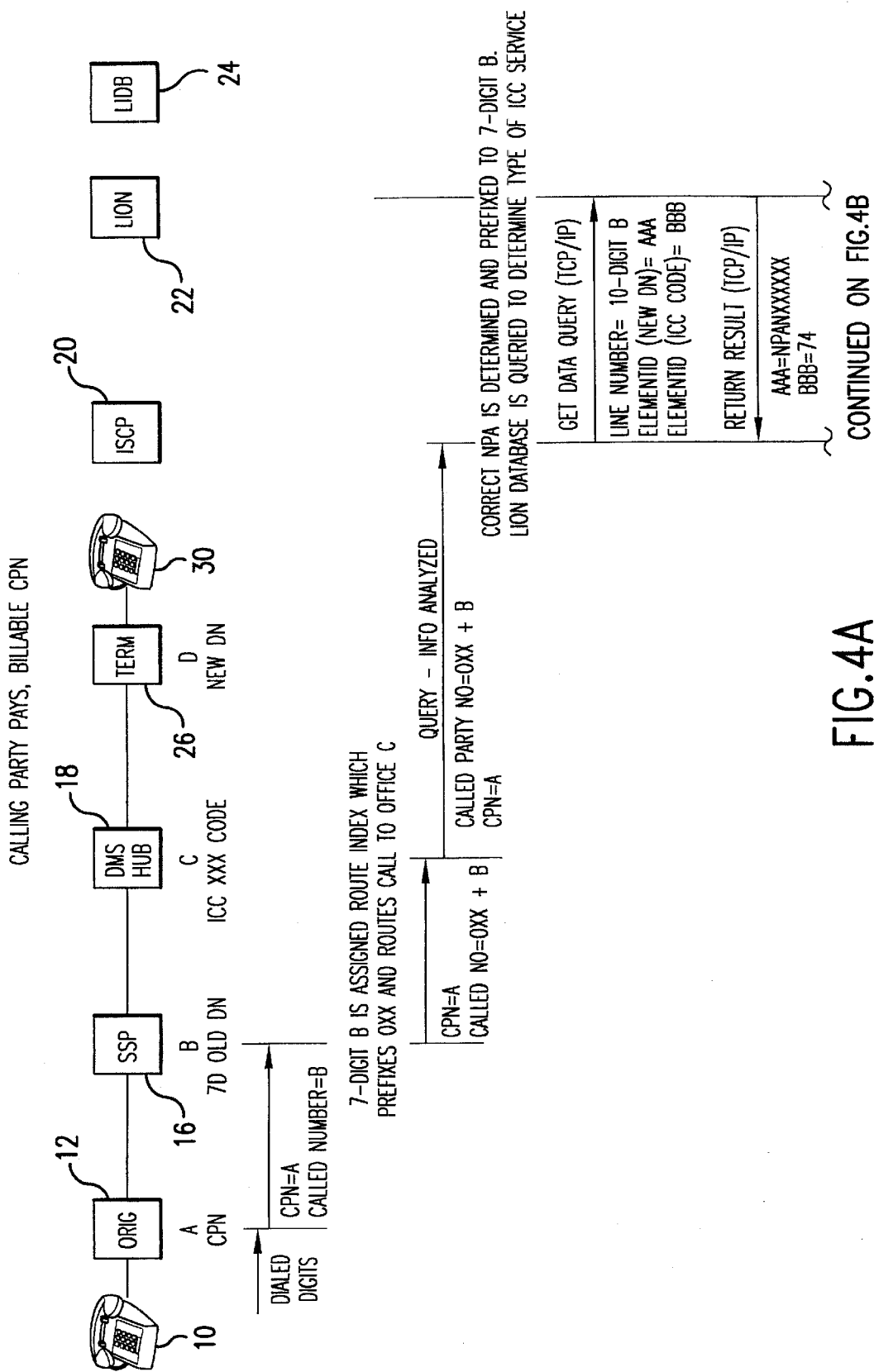
FIGS. 4A and 4B is a message flow diagram showing the message flow between various components of the AIN network for situations when the calling party pays according to an aspect of the present invention.
Figure 4B:
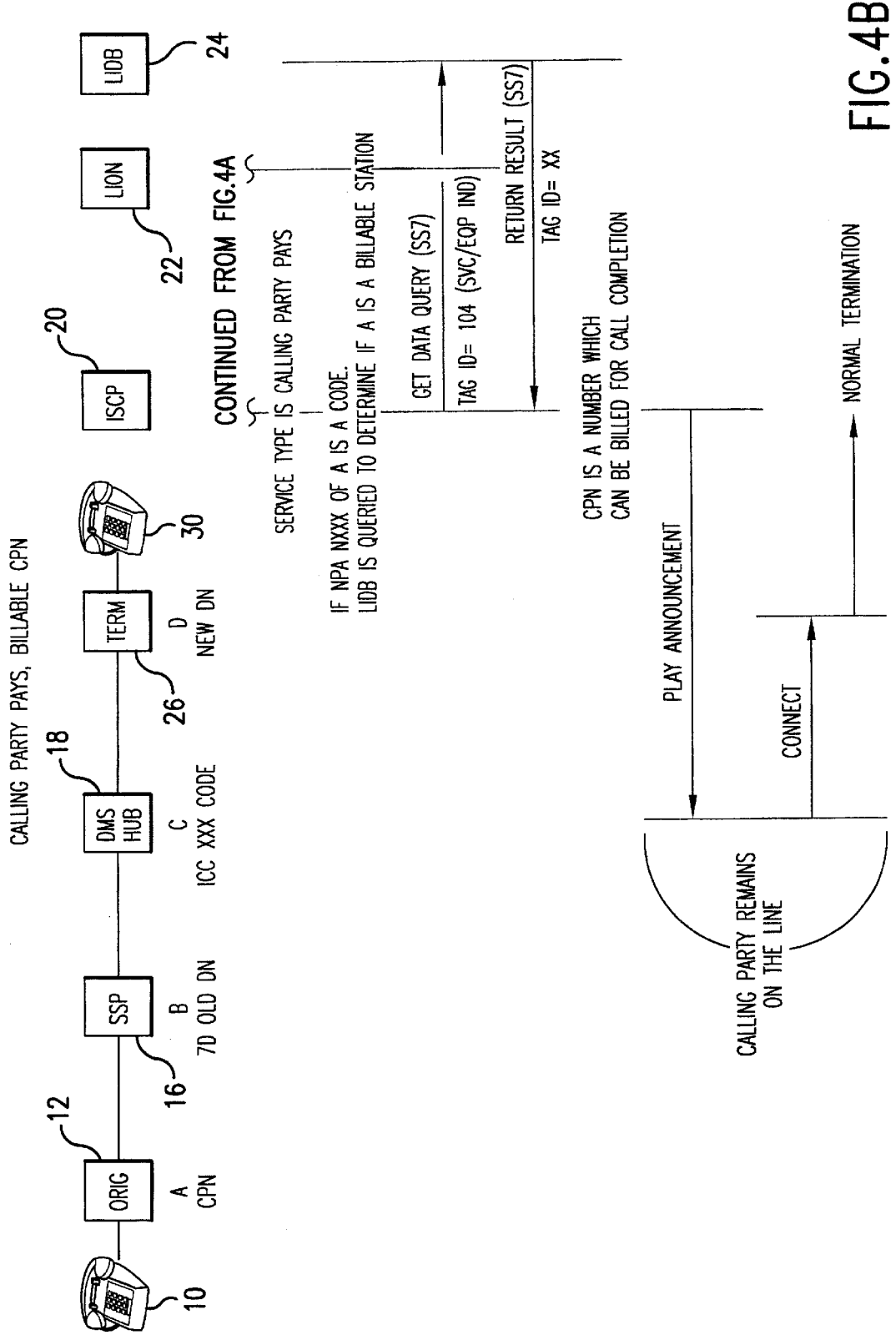

Referring to FIG. 4, initially the calling party 10 enters the digits of the party being called, which are collected by the central office 12. The call is then routed to central office 16, where it is determined that the called number is a forwardable disconnected number, and the 7-digit number is assigned a 0XX code which is prefixed to the collected digits, and routes the call to the DMS hub 18. The prefix causes an AIN trigger to be sent from the DMS hub 18 with the called party number, including the prefix, and the calling party number. The ISCP 20 then determines the correct NPA of the 7-digit dialed number by querying the NPA table 34. The ICC code and new telephone number is then determined from the LION database 22 via a get data query. The LION database 22 returns the 10-digit telephone number of the new telephone number 30 and an ICC code of 74, indicating the ICC service type of calling party pays, as seen in Table 1. If the NPANXX of the calling party is found in the CPN table 36, the calling party is determined to be a customer of the telephone company, and the ISCP 20 then queries the LIDB 24 to determine if the calling party 10 is a billable station. The query returns the service/equipment indicator.

In the example shown in FIG. 4, the LIDB 24 determines the calling party 10 is a number which can be billed for call completion (due to the S/E table lookup). Thus, the ISCP 20 plays a message which includes the new telephone number and asks the calling party whether it would like the call forwarded for a fee. If the calling party remains on the line throughout the message, the call is forwarded to the new telephone number 30 and the calling party 10 is billed accordingly. Therefore, the ISCP 20 sends the new telephone number to the switch, tells the switch to forward the call, and sends appropriate automated message accounting (AMA) modules to the switch for the switch to perform billing in a known manner. When the call is answered at the new telephone number 30, the billing begins.

Figure 5A:
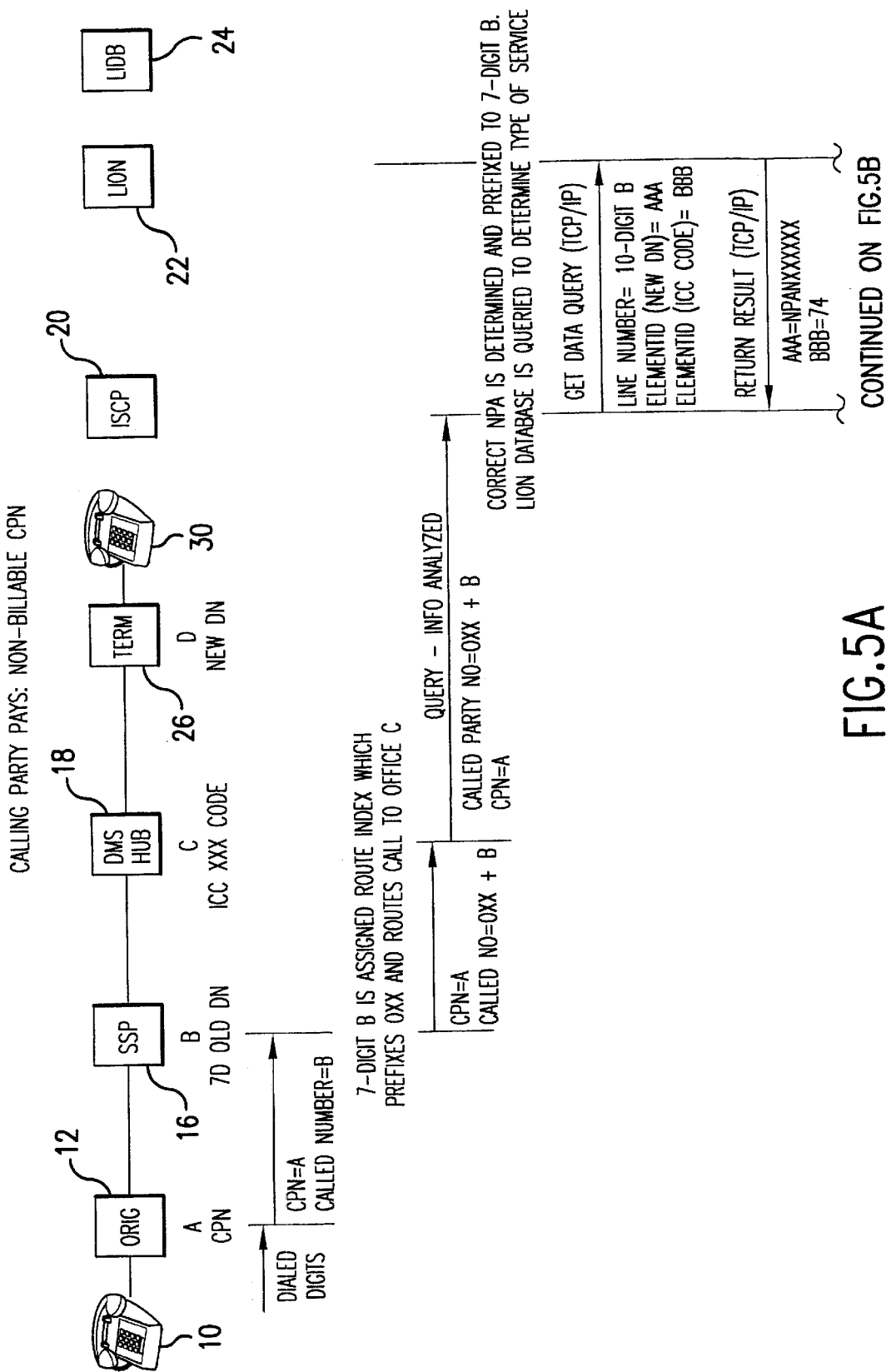
FIGS. 5A and 5B is a message flow diagram showing the message flow between various components of the AIN network for situations when the calling party pays and the calling party is non-billable according to an aspect of the present invention.
Figure 5B:
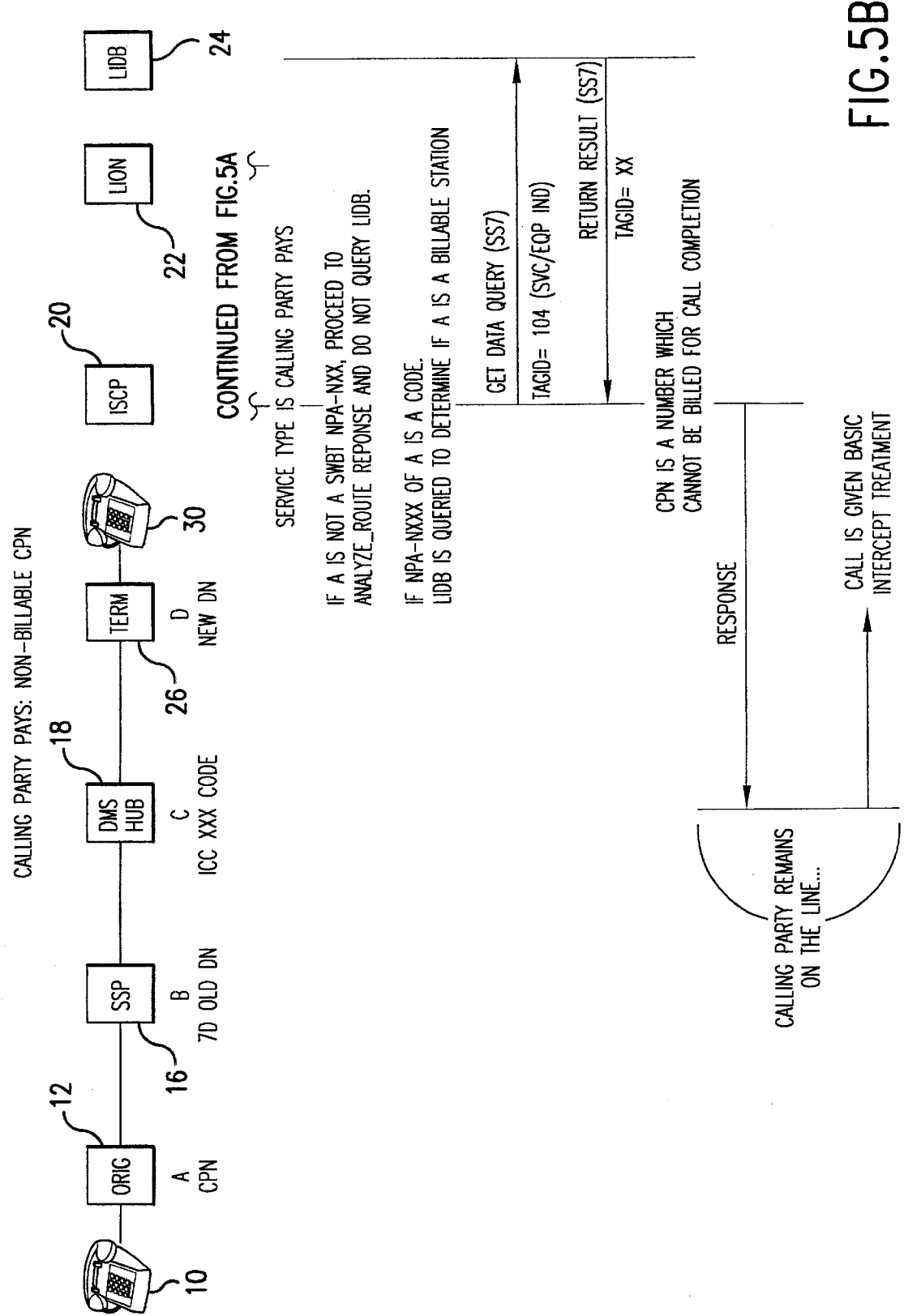

The example shown in FIG. 5 is similar to the example shown in FIG. 4 except in FIG. 5, the results from the LIDB query indicate that the calling party 10 cannot be billed for call completion. Therefore, the call is routed to a standard intercept service and processed accordingly.

Figure 6A:
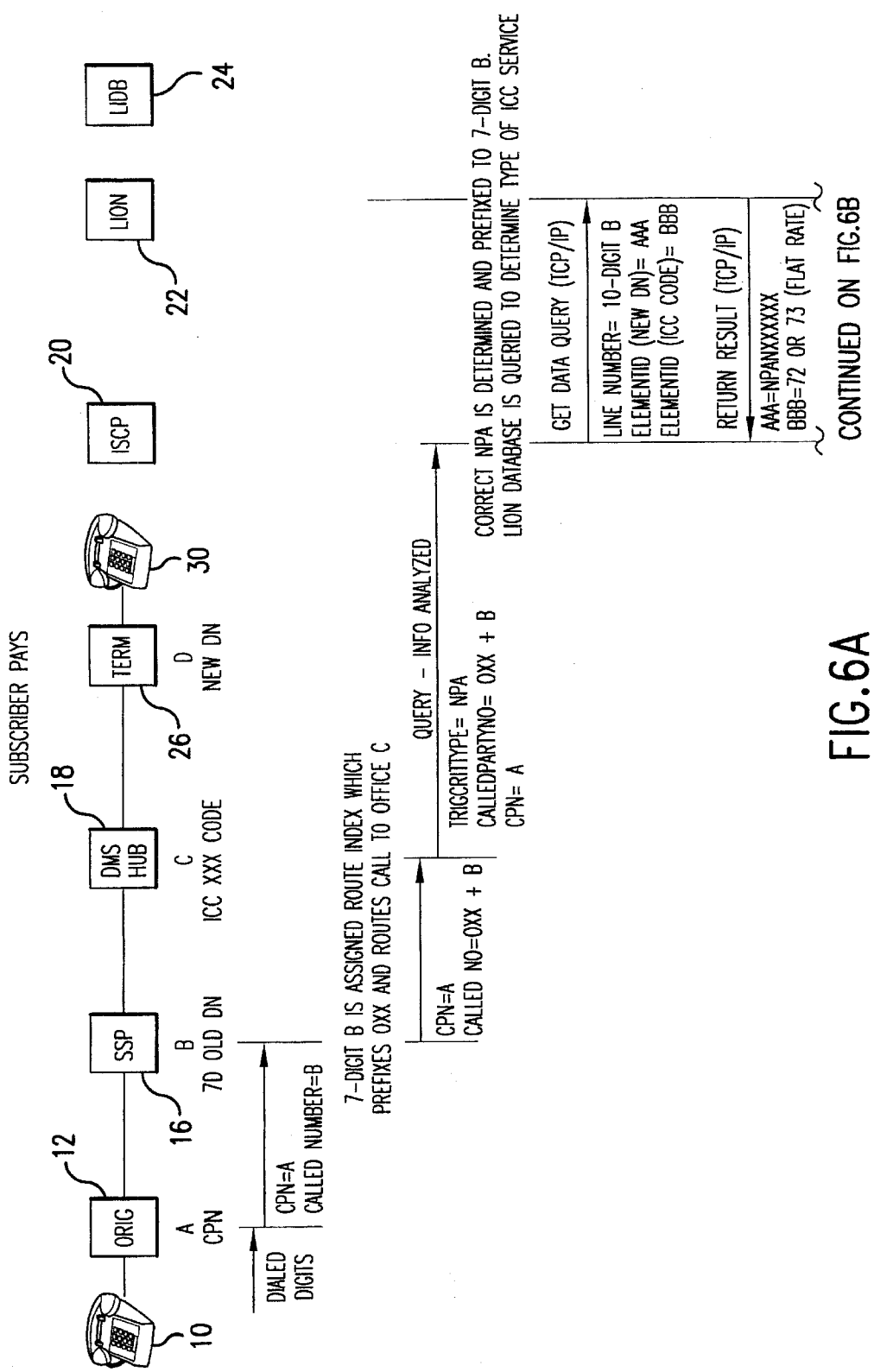

In the example shown in FIG. 6, the LION query returns an ICC code with a value of 72 or 73 which indicates that the service type is subscriber pays, as shown in Table 1. Therefore, no query to LIDB 24 is necessary. Thus, the announcement is immediately played and the call is forwarded to the new telephone number 30.

While the invention has been described with reference to several exemplary embodiments, it is understood that the words which have been used are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses, such as are within the scope of the appended claims.

For example, although the call forwarding system of the present invention has been described with reference to automatically forwarding the call to the new telephone number 30, a dual tone multi-frequency (DTMF) system may be used in cases where the customer with the disconnected number 14 has several locations. For example, a user may be prompted to enter one to forward to a first particular location, two to forward to another location, etc.

Alternatively, the call forwarding system may be limited to certain times of the day. For example, a business subscriber may elect to pay for call forwarding during normal business hours only. Thus, at times other than normal business hours, the LION query could indicate that the service is calling party pays and the calling party will be prompted to see if the calling party would like to pay for the call forwarding.

What is claimed:

1. A call forwarding system for an AIN telecommunications environment in which a destination has changed from an old telephone number to a new telephone number, and a calling party places a call attempting to contact the destination by dialing the old telephone number, the call forwarding system comprising:

means for determining the new telephone number;

means for determining whether the destination has elected to pay for forwarding the call from the old telephone number to the new telephone number, and for determining whether an eligible calling party has elected to pay for forwarding the call from the old telephone number to the new telephone number when the destination has not elected to pay for forwarding the call; and means for completing the call from the calling party to the new telephone number when either the destination or the calling party has elected to pay for forwarding the call.

2. The call forwarding system of claim 1, further comprising means for analyzing the old telephone number and launching an AIN trigger to an AIN platform when the old telephone number satisfies a predetermined criteria, the analyzing means comprising a first central office switching means and a hub central office switching means, the first central office switching means receiving digits dialed by the calling party, prefixing a unique code to the received digits and subsequently forwarding the prefixed received digits to the hub central office switching means, the unique code launching the AIN trigger.

3. The call forwarding system of claim 2, in which the AIN platform determines an NPA of the dialed number based upon a code identifying the first central office switching means and the unique code.

4. The call forwarding system of claim 3, further comprising database means queried by using the received digits and the NPA to determine the new telephone number and whether the destination has elected to sponsor the call forwarding.

5. The call forwarding system of claim 1, in which the AIN platform further comprises means for determining whether the calling party is eligible to pay for forwarding the call when the destination has not elected to pay for call forwarding.

6. The call forwarding system of claim 5, in which the means for determining whether the calling party is eligible determines whether the calling party is served by a same telephone company as a telephone company serving the old telephone number, the means for determining whether the calling party is eligible indicating the calling party is eligible to pay for call forwarding when the same telephone company serves the calling party.

7. The call forwarding system of claim 5, in which the means for determining whether the calling party is eligible determines a type of service/equipment utilized by the calling party and determines whether the calling party's service/equipment complies with eligibility requirements, thereby making the calling party eligible to pay for forwarding the call, the means for determining whether the calling party is eligible indicating the calling party's eligibility when the service/equipment complies with the eligibility requirements.

8. The call forwarding system of claim 1, further comprising ACU measurement means for measuring the usage of an SCP central processing unit.

9. The call forwarding system of claim 1, in which the call is not forwarded when neither the calling party nor destination has elected to pay for forwarding the call.

10. A call forwarding system for an AIN telecommunications environment in which a destination has changed from an old telephone number to a new telephone number, and a calling party places a call attempting to contact the destination by dialing the old telephone number, the call forwarding system comprising;

a hub switching means; and an old address switching means with which the calling party connects to upon dialing the old telephone number, the old address switching means, upon recognizing that the calling party has called a telephone number that has been changed, prefixes the old telephone number with a three digit code, and forwards the call, along with the prefixed old telephone number, to the hub switching means, the hub switching means recognizing the three digit code and initiating an AIN trigger to an AIN platform means that determines the new telephone number and whether the destination has elected to pay for forwarding the call to the new telephone number, and determines whether the calling party has elected to pay for forwarding the call to the new telephone number when the destination has not elected to pay for forwarding the call;

the AIN platform means completing the call to a new telephone number switching means when either the destination or the calling party has elected to pay for forwarding the call.

11. The call forwarding system of claim 10, in which the call is not forwarded when neither the calling party nor destination has elected to pay for forwarding the call.

12. A call forwarding method for an AIN telecommunications environment in which a destination has changed from an old telephone number to a new telephone number, and a calling party places a call attempting to contact the destination by dialing the old telephone number, the call forwarding method comprising the steps for:

locating the new telephone number;

determining whether the destination has elected to pay for forwarding the call from the old telephone number to the new telephone number;

determining whether an eligible calling party has elected to pay for forwarding the call from the old telephone number to the new telephone number when the destination has not elected to pay for forwarding the call; and completing the call from the calling party to the new telephone number if either the destination or the calling party has elected to pay for forwarding the call.

13. The call forwarding method of claim 12, further comprising the steps for:

receiving digits dialed by the calling party at a first central office;

prefixing a unique code to the received digits;

forwarding the prefixed received digits to a hub central office where the unique code causes a AIN trigger to be launched to an AIN platform.

14. The call forwarding method of claim 13, further comprising the step for determining an NPA of the dialed number based upon a code identifying the first central office, and the unique code.

15. The call forwarding method of claim 14, further comprising the step for querying a database, with the received digits and the NPA as keys, to determine the new telephone number and whether the destination has elected to sponsor the call forwarding.

16. The call forwarding method of claim 12, further comprising the step for judging whether the calling party is eligible to pay for forwarding the call when it is determined that the destination has not elected to pay for call forwarding.

17. The call forwarding method of claim 16, further comprising the steps for judging whether the calling party is served by a same telephone company as a telephone company serving the old telephone number, and indicating the calling party is eligible to pay for call forwarding when the same telephone company serves the calling party.

18. The call forwarding method of claim 16, further comprising the steps for:

determining a type of service/equipment utilized by the calling party;

determining whether the calling party's service/equipment complies with eligibility requirements, thereby making the calling party eligible to pay for forwarding the call; and indicating the calling party's eligibility if the service/equipment complies with the eligibility requirements.

19. The call forwarding method of claim 12, further comprising the step for measuring the usage of an SCP central processing unit.

20. The call forwarding method of claim 12, further comprising the step for terminating the call when neither the calling party nor destination has elected to pay for forwarding the call.

21. A call forwarding method for an AIN telecommunications environment in which a destination has changed from an old telephone number to a new telephone number, and a calling party places a call which attempts to contact the destination by dialing the old telephone number, the call forwarding method comprising the steps for:

connecting to an old address switch upon dialing the old telephone number;

prefixing the old telephone number with a three digit code, and forwarding the call, along with the prefixed old telephone number, to a hub switch upon recognizing that the calling party has called a telephone number which has been changed;

recognizing the three digit code at the hub switch and launching an AIN trigger;

determining the new telephone number and whether the destination has elected to pay for forwarding the call to the new telephone number;

determining whether the calling party has elected to pay for forwarding the call to the new telephone number when the destination has not elected to pay for forwarding the call; and completing the call to a new telephone number switch if either the destination or the calling party has elected to pay for forwarding the call.

* * * * *